United States Patent [19]

Spainhour

[11] Patent Number: 4,953,296
[45] Date of Patent: Sep. 4, 1990

[54] METHOD AND APPARATUS FOR PROVIDING RUNOUT COMPENSATION

[75] Inventor: Phillip A. Spainhour, Nashville, Tenn.

[73] Assignee: J. P. Hennessy, LaVergne, Tenn.

[21] Appl. No.: 398,001

[22] Filed: Aug. 24, 1989

[51] Int. Cl.$^5$ .............................................. G01B 7/315
[52] U.S. Cl. .................................................. 33/203.18
[58] Field of Search ...................... 33/203.18, 20.3, 645

[56] References Cited

U.S. PATENT DOCUMENTS 4,138,825  2/1979  Pelta ............................. 33/203.18 X
4,574,490  3/1986  Curchod ........................... 33/203.18

FOREIGN PATENT DOCUMENTS 2356122  2/1978  France ............................. 33/203.18

*Primary Examiner*—Harry N. Haroian
*Attorney, Agent, or Firm*—Edmond T. Patnaude

[57] ABSTRACT

A wheel alignment system includes a gauge head which is adapted to be pendulously mounted to a wheel to be aligned for free rotation about an axis which is coaxial with the axis of rotation of the wheel. The gauge head carries a plurality of level sensors, which are coupled to a microprocessor, and an encoder which is mounted between a shaft, that is mounted to the wheel for rotation therewith, and the gauge head to transmit to said microprocessor signals representative of the angular position of said wheel.

6 Claims, 2 Drawing Sheets

METHOD AND APPARATUS FOR PROVIDING RUNOUT COMPENSATION

The present invention relates in general to methods and apparatus for use in aligning the wheels of automotive vehicles, and it relates more particularly to a new and improved method and apparatus for compensating for the runout of a wheel alignment instrument relative to the axis of rotation of a wheel to which it is mounted.

BACKGROUND OF THE INVENTION

In order to measure the camber and toe of the wheels of an automotive vehicle the common practice is to mount inclinometers to the wheels of the vehicle and to use these instruments to measure the deviation of the planes of the wheels from the horizontal and vertical planes. If the instruments are not precisely aligned with the axis of rotation of the respective wheels the camber and toe measurements will be inaccurate and thus result in misalignment of the wheels of the vehicle.

The inclinometers are generally mounted on a gauge head which is adapted to hang freely like a pendulum from a stub shaft carried by a wheel clamp mounted to the rim of the associated wheel. For various reasons the stub shaft will not be exactly coaxial with the axis of rotation of the associated wheel, a condition known as runout. Many ways of correcting for such misalignment or runout of the instruments are known and described in the literature.

For example, in U.S. Pat. No. 4,138,825 there is described a method of providing runout compensation by measuring and recording the runout at three different angular positions of the associated wheel while the wheel is elevated and then locking the instrument to the wheel to prevent relative movement between the instrument and the wheel and movement of the wheel from the final runout position before letting that wheel back down. A similar procedure is described in U.S. Pat. No. 3,892,042 where the runout measurements are made at two angular positions one-hundred eighty degrees apart before the instrument is locked to the wheel. In U.S. Pat. No. 4,192,074 still another method of compensating for the runout of the wheel alignment instrument is described. In this latter method the wheel is initially rotated through at least one complete revolution to measure and record the runout before the instrument is locked to the wheel and the various wheel alignment measurements are made.

It will be apparent that in all of these prior art systems it is necessary to lock the instruments to the wheels and prevent rotation of the wheel and gauge head combination after runout measurements have been made. Moreover, it is important that the relationships between the wheels and the associated instruments be maintained throughout the wheel alignment procedure or faulty measurements and a consequent misalignment of the vehicle will result. Because of the location of some of the devices which must be adjusted and in some cases because of carelessness, it is not unusual for the technician to accidentally bump one of the instruments and possibly cause it to move relative to the wheel to which it is mounted. When this occurs it is necessary to again jack up the vehicle and repeat the runout measurement procedure to ascertain if the instrument did indeed move relative to the wheel, whether it did in fact move.

SUMMARY OF THE INVENTION

Briefly, in accordance with the present invention there is provided a new and improved method of compensating for the runout of a wheel alignment instrument and a new and improved wheel alignment instrument which may be used to easily measure runout and to indicate if the instrument has been moved relative to the wheel after runout has been measured and recorded. The instrument embodying the invention utilizes a conventional wheel clamp including a generally horizontal shaft on which a gauge head is rotatably mounted. The gauge head carries at least one inclinometer. In addition, however, an encoder is mounted between the shaft and the gauge head to provide information which directly relates the angle measured by the inclinometer to the angular position of rotation of the wheel. Consequently, rotation of the wheel and wheel clamp shaft will cause data from the encoder and the camber inclinometer to be entered into the microprocessor for computation of the runout compensation necessary for the camber and toe readings. Furthermore, it will not be necessary to prevent rotation of the wheel after the runout information has been gathered and recorded. The proper amount of runout compensation will be continually updated at each gauge head until the next step in the alignment process. This will not occur until all wheels have been runout compensated, the vehicle lowered back down and the gauge heads locked to the wheelclamps.

During the other wheel alignment procedures where relative movement between the instrument and the wheel cannot be tolerated the encoder provides an indication if any such movement occurs. An alarm is actuated by a signal from the encoder to warn the technician that such movement has occurred. At that time it is only necessary for the technician to readjust the gauge head to its original position while being assisted by the output of the encoder.

GENERAL DESCRIPTION OF THE DRAWING

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
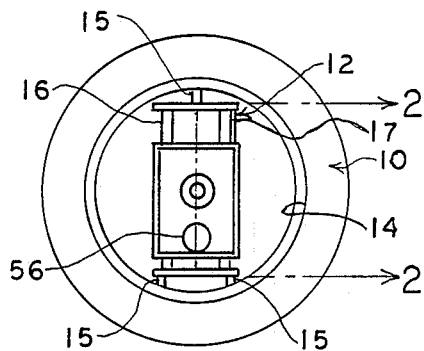
FIG. 1 is a side elevational view of a wheel of an automotive vehicle to which a wheel alignment instrument embodying the present invention is mounted.
Figure 2:
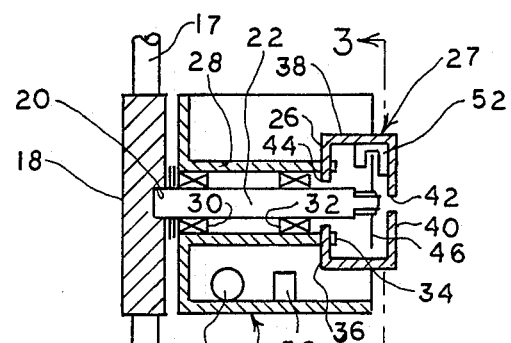
FIG. 2 is a cross-sectional view taken along the line 2—2 of FIG. 1.

Referring particularly to FIGS. 1 and 2, a vehicle wheel 10 has a wheel clamp 12 mounted to the wheel rim 14 by any suitable means such, for example, as the three mounting pins 15 in the wheel adapter assembly shown in U.S. Pat. No. 3,892,042. The wheel clamp 12 includes a pair of parallel rods 16 and 17 to which a central mounting plate 18 is mounted for adjustable movement relative to the wheel rim so as to align a centrally located blind reference and mounting hole 20 with the axis of rotation of the wheel. The hole 20 is provided with an internal thread to which a shaft 22 is threadedly connected. A gauge head 24 is pendulously mounted for free rotation on the shaft 22 and a housing 26 of an encoder 27 is mounted to the gauge head 24 for unitary motion therewith.

It may be seen from FIG. 2 that the gauge head 24 includes an elongated tubular section 28 which carries a pair of spaced bearings 30 and 32 which rotatably support the gauge head on the shaft 22. A plurality of machine screws 34 extend through holes in the inner wall 36 of the encoder housing 26 and are threaded into threaded blind holes provided in the distal end of the tubular section 28 of the gauge head 24 to affix the encoder housing to the gauge head.

Figure 3:
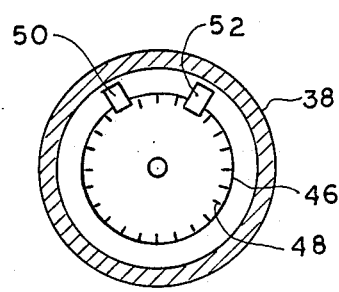
FIG. 3 is a cross-sectional view taken along the line 3—3 of FIG. 3 assuming the entire device to be shown therein.

The encoder housing 26 may be seen to consist of a hollow body section 38 and an outer circular plate-like wall 40 having a central opening 42. The inner wall 36 is also provided with a central opening 44 through which the shaft extends into the space between the walls 36 and 40. A pulse wheel 46 is fixedly mounted to the shaft 22, and as best shown in FIG. 3, is provided with a plurality of equally spaced radial slits 48. The angular width of each slit and of the space between adjacent slits are the same. A pair of position sensors 50 and 52 are mounted to the encoder housing 26 and respectively include a light source and a light detector positioned on opposite sides of the wheel 46. Position sensors of this type are well known in the art and generate an electric signal each time one of the slits 48 is positioned between one of the light sources and its associated sensor. The sensors 50 and 52 are positioned relative to one another and to the pulse wheel such that at any single angular position of the pulse wheel only one or the other of the sensors detects a slit and produces an electric signal. Consequently, as the wheel 46 is rotated, a square wave signal is developed by each of the sensors and the two signals are 90 degrees out of phase. As is well known in the art, the use of two position sensors quadruples the accuracy of the system to detect and measure the angular position of the wheel.

In addition to the wheel angle sensors 50 and 52 a plurality of inclinometers 54 and 56 are carried by the gauge head 24 for measuring the angle at which the axis of rotation of the wheel meets the vertical plane for use in measuring the camber and steering axis inclination of the associated wheel to which the gauge head is mounted. Other sensors may be mounted to the gauge head for measuring other wheel alignment factors such as toe angle and the like. Typically, the gauge heads which are mounted to the rear wheels of the vehicle have two sensors, one for measuring toe and the other for measuring camber while those which are mounted to the front wheels have four sensors, one for measuring front toe, one for measuring camber, one for measuring toe angle relative to its respective rear wheel, and one for measuring steering axis inclination.

It is well known that any wobble of the wheel as it rotates on the associated axle affects these measurements, so if the wheels are to be properly aligned it is necessary that either the wobble be eliminated or its effects on the said measurements be compensated for. Since the runout of the axle causes the wobble, and it cannot be entirely eliminated, the usual practice is to modify the actual toe and camber measurements to compensate for such runout. In the past this was done by initially rotating the wheel to a plurality of specified angular positions and measuring and recording the runout at each of these plurality of positions while the wheel is locked against rotation. Thereafter the wheel must be prevented from rotating throughout the wheel alignment procedure or erroneous measurements of toe and camber will result. This is particularly difficult while checking the runout of the other three wheels where the wheels are coupled together by a differential. For example, if both wheels are off the ground, which is customary in wheel alignment during the runout measurement procedure, when one wheel is rotated in one direction the other wheel rotates in the opposite direction. With limited-slip open differentials the amount of torque required to keep the first runout compensated wheel from rotating when the other wheel is being checked for runout can be as great as 100 foot pounds. Spurious rotation of a runout compensated wheel may also occur after all of the wheels have been compensated for runout by the accidental bumping of one or more of the gauge heads. In any case, rotation of a wheel after the runout measurements have been made and the runout compensating factor has been calculated results in inaccurate wheel alignment readings.

Figure 4:
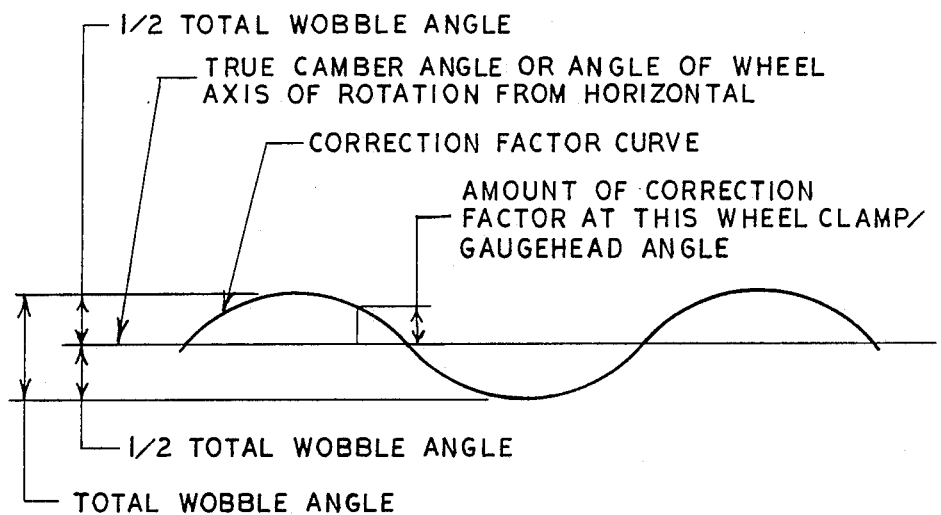
FIG. 4 is a waveform representing the wobble of a wheel and its effect on the measurement of the camber angle of the wheel.

In FIG. 4 there is shown in graphic form the effect of wheel axle runout on the camber measurement. It may be seen that depending on the angular position of the wheel the effect of runout varies. In FIG. 4 the horizontal axis is the rotational angle of the wheel clamp in relation to the stationary gauge head, and the vertical axis is the correction factor required to correct the camber measurement for runout at the particular angle of rotation of the wheel. It will be seen that the correction factor curve is a sine wave.

In the runout compensation systems known in the prior art runout is measured at either two or four points along this curve and no subsequent angular movement either of the gauge head or of the wheel can be tolerated.

OPERATION

Figure 5:
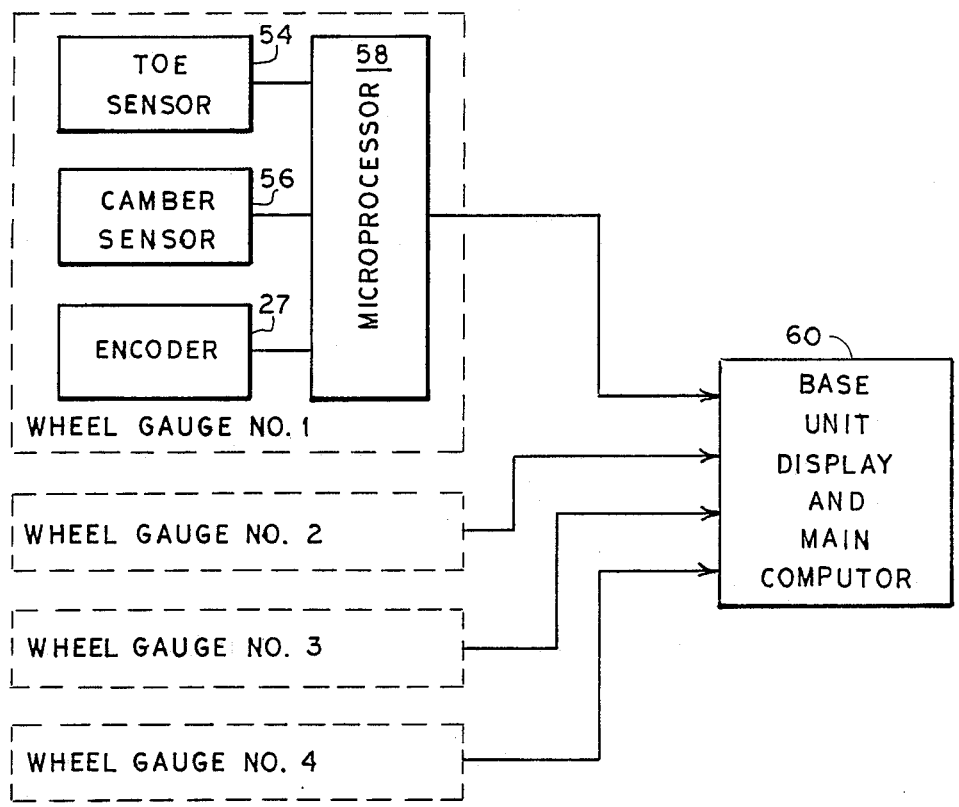
FIG. 5 is a block diagram of a wheel alignment system embodying the present invention.

At the beginning of the wheel alignment procedure and after the wheel clamp and associated gauge head 24 have been mounted to the wheel to be aligned, the technician actuates the microprocessor 58 shown in FIG. 5 to measure the runout of that wheel. The wheel is then rotated through 360 degrees or more and the signals generated by each of the encoder 27 and the inclinometer 56 are transmitted to the microprocessor 58 where they are computed and recorded. This process is then repeated for each additional wheel. When the toe and camber measurements are subsequently made, the runout of the associated wheel axle is factored into the measurement and the true toe and camber angles are displayed on a display at the base unit 60 driven by the microprocessor 58 and the main computer in the base unit 60, the toe compensation factor being 90 degrees out of phase from camber on the correction factor curve.

If the operator should accidentally bump a gauge head during the wheel alignment procedure, a signal will be generated by the associated position sensors 50 and 52 and the microprocessor 58 will transmit to the base unit the amount of angular movement which resulted so that the operator can quickly reposition the gauge head to its original position. In the prior art systems, when a gauge was bumped it was necessary for the technician to completely remeasure the runout by again rotating the associated wheel to the two or four angular positions at which the system measures runout.

It may be seen that with the provision of the encoder 27 in the gauge head 24 the conventional wheel alignment procedure is greatly improved in that more accurate measurements can be made while the overall time required to measure the runout of each wheel is reduced and such measurement need be made only once. Moreover, if the gauge head has been moved unbeknownst to the technician, the movement is detected by the encoder and such fact is displayed on the display at the base unit 60 and an alarm is given.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed is:

1. In a wheel alignment system, the combination comprising
    support means adapted to be mounted to a wheel of a vehicle,
    a shaft extending from said support means in substantial coaxial relationship with the axis of rotation of said wheel,
    a gauge head rotatably carried by said shaft for pendulous movement relative to said shaft,
    sensor means carried by said gauge head for making wheel alignment measurements, and
    encoder means mounted between said shaft and said gauge head for producing a signal indicative of the angular position of said wheel relative to said gauge head.

2. The combination according to claim 1 wherein said encoder means comprises
    a wheel having a plurality of equally spaced openings,
    said wheel being affixed to said shaft for rotation therewith, and
    wheel position sensor means carried by said gauge head and responsive to said openings for producing said signal when said wheel of said vehicle is rotated.

3. The combination according to claim 1 wherein said sensor means comprises
    at least one inclinometer carried by said gauge head.

4. A wheel alignment system, comprising the combination set forth in claim 3, and
    microprocessor means responsive to signals from said inclinometer and from said encoder means for storing the runout correction factors for said wheel.

5. A wheel alignment system according to claim 4, comprising
    display means responsive to a signal from said microprocessor for providing a visual indication of relative rotation between said wheel and said gauge head.

6. A wheel alignment system according to claim 5, wherein
    said display means displays the degree of relative rotation between said wheel and said gauge head.

* * * * *